United States Patent
Scoda

(10) Patent No.: US 11,216,342 B2
(45) Date of Patent: Jan. 4, 2022

(54) METHODS FOR IMPROVED AUDITING OF WEB SITES AND DEVICES THEREOF

(71) Applicant: Usablenet Inc.

(72) Inventor: Enrico Scoda, Martignacco (IT)

(73) Assignee: USABLENET INC., New York, NY (US)

( * ) Notice: Subject to any disclaimer, the term of this patent is extended or adjusted under 35 U.S.C. 154(b) by 88 days.

(21) Appl. No.: 15/375,676

(22) Filed: Dec. 12, 2016

(65) Prior Publication Data

US 2018/0165258 A1   Jun. 14, 2018

(51) Int. Cl.
*G06F 11/14* (2006.01)
*G06F 16/958* (2019.01)

(52) U.S. Cl.
CPC ........ *G06F 11/1448* (2013.01); *G06F 16/958* (2019.01); *G06F 2201/84* (2013.01)

(58) Field of Classification Search
CPC ............. G06F 17/2211; G06F 11/1448; G06F 17/2447; G06F 17/2785; G06F 17/3089; G06F 16/958; G06F 2201/84
USPC ........................................................ 715/237
See application file for complete search history.

(56) References Cited

U.S. PATENT DOCUMENTS

| | | | | |
|---|---|---|---|---|
| 6,907,546 B1 * | 6/2005 | Haswell | ............. | G06F 11/3684 714/38.11 |
| 7,478,365 B2 * | 1/2009 | West | .................. | G06F 11/3684 714/E11.208 |
| 9,292,423 B1 * | 3/2016 | Doshi | ................. | G06F 11/3664 |
| 9,679,090 B1 * | 6/2017 | Marolia | ............. | G06F 11/3688 |
| 9,898,396 B2 * | 2/2018 | Owen | ................. | G06F 11/3688 |
| 2005/0166094 A1 * | 7/2005 | Blackwell | ........... | G06F 11/3664 714/38.14 |
| 2007/0234217 A1 * | 10/2007 | Miller | ..................... | H04L 43/50 715/738 |
| 2007/0263546 A1 * | 11/2007 | Chowdhury | ........ | H04L 12/2697 370/242 |
| 2009/0307763 A1 * | 12/2009 | Rawlins | ............. | G06F 9/44505 726/5 |
| 2010/0146488 A1 * | 6/2010 | Chen | ................... | G06F 11/3688 717/128 |

(Continued)

OTHER PUBLICATIONS

"WebDriver; W3C Candidate Recommendation", Mar. 30, 2017, 128 pages, Retrieved from http://www.w3.org/TR/webdriver/, W3C.

*Primary Examiner* — Thu V Huynh
(74) *Attorney, Agent, or Firm* — Troutman Pepper Hamilton Sanders LLP (Rochester)

(57) ABSTRACT

Methods, non-transitory computer readable media, audit management apparatuses, and audit management systems that execute an automated test script comprising a plurality of script instructions corresponding to one or more step changes or one or more action changes performed with respect to a web site. A snapshot of at least a portion of a web page of the web site is generated for each of the step changes and each of the action changes. One or more semantic attributes are obtained and associated with each of the snapshots. One or more rules are applied to the semantic attributes to generate one or more issues associated with each of the snapshots. A selection of one of the step changes or one of the action changes is received. A subset of the issues and one of the snapshots corresponding to the selected step change or action change are output to a display device.

18 Claims, 14 Drawing Sheets

(56) References Cited

U.S. PATENT DOCUMENTS

| | | | |
|---|---|---|---|
| 2011/0131551 A1* | 6/2011 | Amichai | G06F 11/3668 717/125 |
| 2011/0310041 A1* | 12/2011 | Williams | G06F 11/3672 345/173 |
| 2012/0290920 A1* | 11/2012 | Crossley | G06F 11/3664 715/234 |
| 2013/0117731 A1* | 5/2013 | LeSuer | G06F 11/3672 717/125 |
| 2013/0283137 A1* | 10/2013 | Wu | G06F 16/955 715/205 |
| 2014/0229614 A1* | 8/2014 | Aggarwal | H04M 3/2227 709/224 |
| 2014/0229869 A1* | 8/2014 | Chiantera | G06F 9/451 715/763 |
| 2014/0324553 A1* | 10/2014 | Rosenberg | G16H 10/20 705/7.41 |
| 2014/0325486 A1* | 10/2014 | Zhang | G06F 11/3692 717/125 |
| 2015/0309813 A1* | 10/2015 | Patel | G06F 8/75 703/22 |
| 2015/0324274 A1* | 11/2015 | Raghavan | G06F 11/3684 717/124 |
| 2015/0339213 A1* | 11/2015 | Lee | G06F 11/3664 717/125 |
| 2016/0062745 A1* | 3/2016 | Rao | G06F 8/33 717/109 |
| 2017/0052877 A1* | 2/2017 | Ganda | G06F 11/3664 |
| 2017/0075790 A1* | 3/2017 | Macleod | G06F 11/3664 |
| 2017/0277625 A1* | 9/2017 | Shtuchkin | G06F 11/3688 |
| 2018/0011780 A1* | 1/2018 | Aggarwal | G06F 11/3672 |
| 2018/0067845 A1* | 3/2018 | Costello, Jr. | G06F 11/3684 |

\* cited by examiner

METHODS FOR IMPROVED AUDITING OF WEB SITES AND DEVICES THEREOF

FIELD

This technology generally relates to methods and devices for auditing web sites and, more particularly, to improved auditing of web sites having dynamic web site elements.

BACKGROUND

Web site administrators and developers often utilize auditing processes to evaluate web sites with respect to correctness, performance, usability, accessibility, and security, for example. In addition to manual web site auditing methods, automated tools, such as web site crawling and web browser plug-in methods, can be utilized to generate evaluation results that are manually reviewed and interpreted.

In the web site crawling method, an auditing program crawls a web site by retrieving each reachable web page of the web site and evaluating the retrieved web pages with respect to security, for example, by applying rules to identify possible issues. Web site auditing methods that utilize web browser plug-ins generally evaluate live web pages of a web site with respect to accessibility, for example, while the web pages are browsed.

Current web site auditing techniques are inaccurate, inefficient, and/or inadequate to audit complex, dynamic web sites that focus on task execution and interaction with dynamic elements, instead of merely presenting static content. In particular, current techniques are unable to effectively identify, evaluate, and report on dynamic web page changes, such as those resulting from a user interaction that may only change a portion or fragment of a web page.

More specifically, web crawler techniques are only able to identify web pages associated with a web site, and are ineffective to identify and evaluate dynamic changes to portions of particular web pages. Web browser plug-in techniques are inaccurate and often miss dynamic changes that can occur in unobserved task flows. Moreover, current auditing methods do not present result data effectively and require a significant amount of time to evaluate such data in a manual process that is susceptible to human error.

SUMMARY

A method for improved auditing of web sites implemented by a audit management system comprising one or more audit management apparatuses or server devices includes executing an automated test script comprising a plurality of script instructions corresponding to one or more step changes or one or more action changes performed with respect to a web site. The step changes correspond with loading of a new web page of the web site and the action changes correspond with a change to one or more fragments of a current web page of the web site. A snapshot of at least a portion of a web page of the web site is generated and stored for each of the step changes and each of the action changes. One or more semantic attributes of the at least a portion of the web page are obtained and stored as associated with each of the snapshots. One or more rules are applied to the semantic attributes to generate one or more issues for each of the snapshots. The issues are stored as associated with a corresponding one of the snapshots. An indication of each of the step changes and action changes is output and a selection of one of the step changes or one of the action changes is received. A subset of the issues and one of the snapshots corresponding to the selected step change or action change is retrieved and output.

An audit management apparatus, comprising memory comprising programmed instructions stored thereon and one or more processors configured to be capable of executing the stored programmed instructions to execute an automated test script comprising a plurality of script instructions corresponding to one or more step changes or one or more action changes performed with respect to a web site. The step changes correspond with loading of a new web page of the web site and the action changes correspond with a change to one or more fragments of a current web page of the web site. A snapshot of at least a portion of a web page of the web site is generated and stored for each of the step changes and each of the action changes. One or more semantic attributes of the at least a portion of the web page are obtained and stored as associated with each of the snapshots. One or more rules are applied to the semantic attributes to generate one or more issues for each of the snapshots. The issues are stored as associated with a corresponding one of the snapshots. An indication of each of the step changes and action changes is output and a selection of one of the step changes or one of the action changes is received. A subset of the issues and one of the snapshots corresponding to the selected step change or action change is retrieved and output.

A non-transitory computer readable medium having stored thereon instructions for improved auditing of web sites comprising executable code which when executed by one or more processors, causes the one or more processors to execute an automated test script comprising a plurality of script instructions corresponding to one or more step changes or one or more action changes performed with respect to a web site. The step changes correspond with loading of a new web page of the web site and the action changes correspond with a change to one or more fragments of a current web page of the web site. A snapshot of at least a portion of a web page of the web site is generated and stored for each of the step changes and each of the action changes. One or more semantic attributes of the at least a portion of the web page are obtained and stored as associated with each of the snapshots. One or more rules are applied to the semantic attributes to generate one or more issues for each of the snapshots. The issues are stored as associated with a corresponding one of the snapshots. An indication of each of the step changes and action changes is output and a selection of one of the step changes or one of the action changes is received. A subset of the issues and one of the snapshots corresponding to the selected step change or action change is retrieved and output.

An audit management system, comprising one or more audit management apparatuses or server devices, the audit management system comprising memory comprising programmed instructions stored thereon and one or more processors configured to be capable of executing the stored programmed instructions to execute an automated test script comprising a plurality of script instructions corresponding to one or more step changes or one or more action changes performed with respect to a web site. The step changes correspond with loading of a new web page of the web site and the action changes correspond with a change to one or more fragments of a current web page of the web site. A snapshot of at least a portion of a web page of the web site is generated and stored for each of the step changes and each of the action changes. One or more semantic attributes of the at least a portion of the web page are obtained and stored as associated with each of the snapshots. One or more rules are applied to the semantic attributes to generate one or more issues for each of the snapshots. The issues are stored as associated with a corresponding one of the snapshots. An indication of each of the step changes and action changes is output and a selection of one of the step changes or one of the action changes is received. A subset of the issues and one of the snapshots corresponding to the selected step change or action change is retrieved and output.

This technology provides a number of advantages including providing methods, non-transitory computer readable media, audit management apparatuses, and audit management systems that more effectively audit web sites with dynamic content. With this technology, snapshots of changes made to dynamic content by an automated test script are maintained and associated with identified issues in order to facilitate a more effective audit report for a web site. This technology advantageously audits complex, dynamic web sites and automatically categorizes and evaluates dynamic changes and associated issues to reduce the number of audit review errors, resulting in improved web site quality, particularly with respect to accessibility and security.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
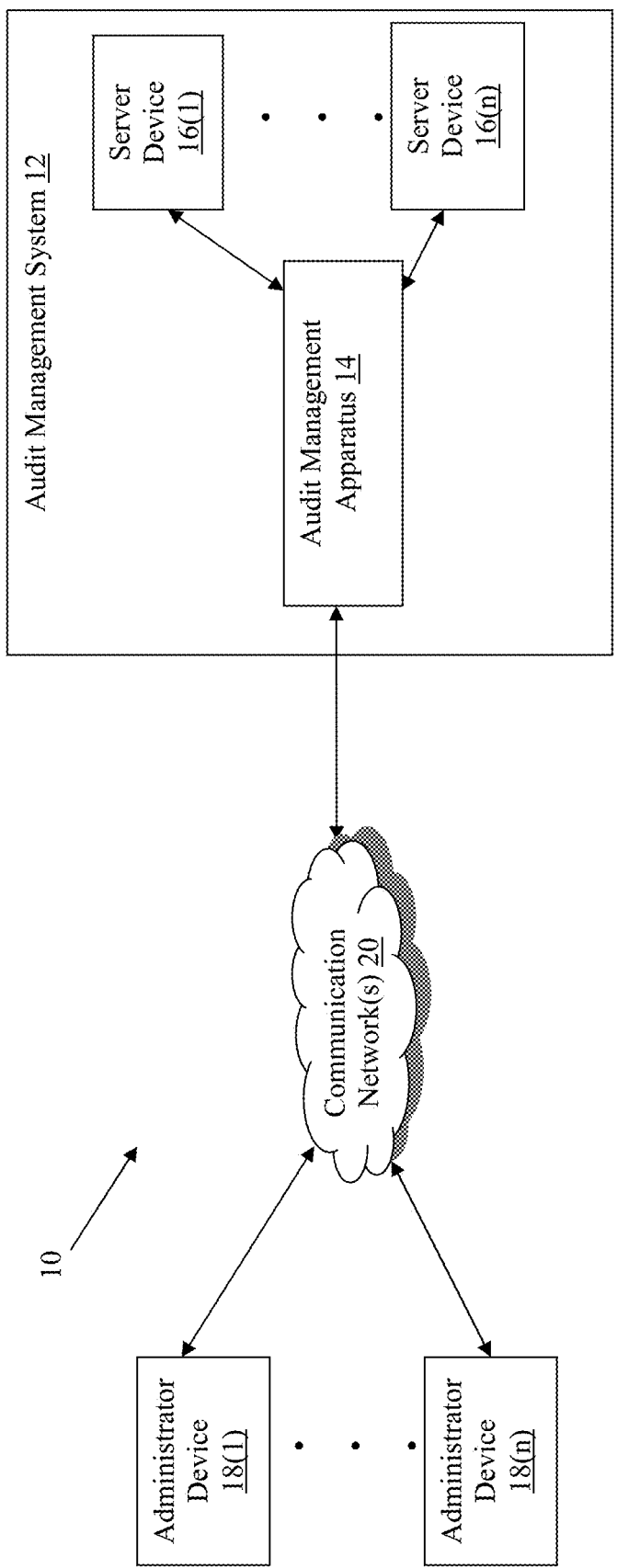
FIG. 1 is a block diagram of a network environment with an exemplary audit management system.

Referring to FIG. 1, an exemplary network environment 10 which incorporates an exemplary audit management system 12 is illustrated. The audit management system 12 in this example includes an audit management apparatus 14 that is coupled to a plurality of server devices 16(1)-16(n) and a plurality of administrator devices 18(1)-18(n) via communication network(s) 20, although the audit management apparatus, server devices, and/or administrator devices may be coupled together via other topologies. Additionally, the network environment 10 may include other network devices such as one or more routers and/or switches, for example, which are well known in the art and thus will not be described herein. This technology provides a number of advantages including methods, non-transitory computer readable media, audit management systems, and audit management apparatuses that more effectively audit web sites that include dynamic content and report issues identified by the audit in order to facilitate improved web site quality.

Figure 2:
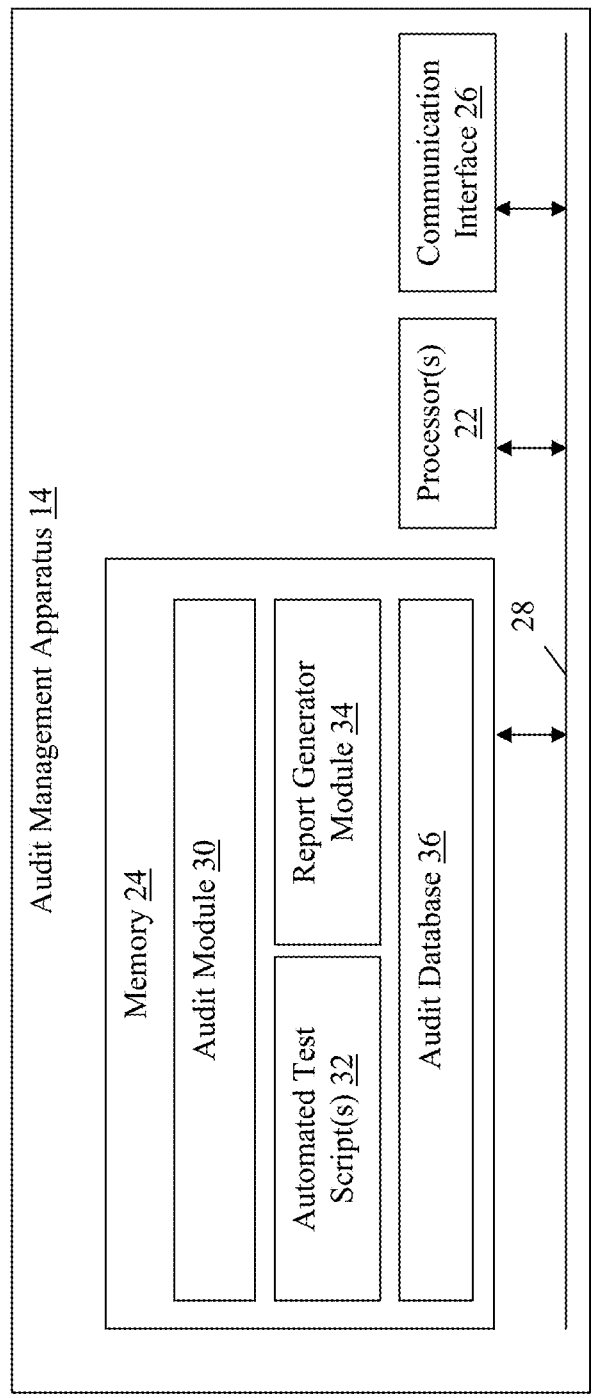
FIG. 2 is a block diagram of an exemplary audit management apparatus of the audit management system.

Referring to FIGS. 1-2, the audit management apparatus 14 of the audit management system 12 may perform any number of functions in addition to auditing web sites including managing network traffic, load balancing network traffic across the server devices 16(1)-16(n), and/or optimizing web content hosted by the server devices 16(1)-16(n) for delivery to client devices (not shown). The audit management apparatus 14 in this example includes one or more processors 22, a memory 24, and/or a communication interface 26, which are coupled together by a bus 28 or other communication link, although the audit management apparatus can include other types and/or numbers of elements in other configurations.

The processor(s) 22 of the audit management apparatus 14 may execute programmed instructions stored in the memory 24 of the audit management apparatus 14 for the any number of the functions identified above. The processor(s) 22 of the audit management apparatus 14 may include one or more CPUs or general purpose processors with one or more processing cores, for example, although other types of processor(s) can also be used.

The memory 24 of the audit management apparatus 14 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 24.

Accordingly, the memory 24 of the audit management apparatus 14 can store one or more applications that can include computer executable instructions that, when executed by the audit management apparatus 14, cause the audit management apparatus 14 to perform actions, such as to transmit, receive, or otherwise process messages, for example, and to perform other actions described and illustrated below with reference to FIGS. 3-14. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the audit management apparatus 14 itself, may be located in virtual server(s) running in a cloud-based computing environment rather than being tied to one or more specific physical network computing devices. Also, the application(s) may be running in one or more virtual machines (VMs) executing on the audit management apparatus 14. Additionally, in one or more embodiments of this technology, virtual machine(s) running on the audit management apparatus 14 may be managed or supervised by a hypervisor.

In this particular example, the memory 24 of the audit management apparatus 14 includes an audit module 30, automated test script(s) 32, a report generator module 34, and an audit database 26, although the memory 24 can include other policies, modules, databases, or applications, for example. The audit module 30 in this example is configured to execute the automated test script(s) 32 in order to perform actions on a web site to be audited that is hosted by one of the server devices 16(1)-16(n). The actions correspond to step changes when they result in the loading of a new web page of the web site and action changes when they result in a change to a dynamic portion or fragment of a web page of the web site.

The audit module 30 is further configured to generate snapshots and obtain semantic attributes associated with the step and action changes. Additionally, the audit module 30 applies stored rules in order to evaluate the semantic attributes with respect to various aspects of web site quality, such as correctness, performance, usability, accessibility, and security, for example, and generate associated issues. The generated snapshots, obtained semantic attributes, and generated issues are stored by the audit module 30 in the audit database 26, for example.

The report generator module 34 in this example automatically analyzes the data stored in the audit database to categorize and report the issues in an improved manner that facilitates more effective review of issues associated with audited web sites. Accordingly, the report generator module 34 generates graphical interfaces, receives selection of step and action changes, and outputs snapshots and associated issues, which are analyzed and categorized, in order to facilitate an improved analysis of web sites, as described and illustrated in more detail later.

The communication interface 26 of the audit management apparatus 14 operatively couples and communicates between the audit management apparatus 14, the server devices 16(1)-16(n), and/or the administrator devices 18(1)-18(n), which are all coupled together by the communication network(s) 20, although other types and/or numbers of communication networks or systems with other types and/or numbers of connections and/or configurations to other devices and/or elements can also be used.

By way of example only, the communication network(s) 20 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 20 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 20 can also include direct connection(s) (e.g., for when a device illustrated in FIG. 1, such as the audit management apparatus 14, one or more of the administrator devices 18(1)-18(n), or one or more of the server devices 16(1)-16(n) operate as virtual instances on the same physical machine).

While the audit management apparatus 14 is illustrated in this example as including a single device, the audit management apparatus 14 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the audit management apparatus 14.

Additionally, one or more of the devices that together comprise the audit management apparatus 14 in other examples can be standalone devices or integrated with one or more other devices or apparatuses, such as one of the server devices 16(1)-16(n), for example. Moreover, one or more of the devices of the audit management apparatus 14 in these examples can be in a same or a different communication network including one or more public, private, or cloud networks, for example.

Each of the server devices 16(1)-16(n) of the audit management system 12 in this example includes one or more processors, a memory, and a communication interface, which are coupled together by a bus or other communication link, although other numbers and/or types of network devices could be used. The server devices 16(1)-16(n) in this example process messages received from the administrator devices 18(1)-18(n) via the communication network(s) 20 according to the HTTP-based application RFC protocol, for example. The server devices 16(1)-16(n) may be hardware or software or may represent a system with multiple servers in a pool, which may include internal or external networks. The server devices 16(1)-16(n) may host web sites including a plurality of web pages that can be accessed and audited by the audit management apparatus 14, as described and illustrated in more detail later.

Although the server devices 16(1)-16(n) are illustrated as single devices, one or more actions of each of the server devices 16(1)-16(n) may be distributed across one or more distinct network computing devices that together comprise one or more of the server devices 16(1)-16(n). Moreover, the server devices 16(1)-16(n) are not limited to a particular configuration. Thus, the server devices may contain a plurality of network computing devices that operate using a master/slave approach, whereby one of the network computing devices of the server devices 16(1)-16(n) operate to manage and/or otherwise coordinate operations of the other network computing devices. The server devices 16(1)-16(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 16(1)-16(n) can operate within the audit management apparatus 14 itself rather than as a stand-alone server device communicating with the audit management apparatus 14. In this example, the one or more server devices 16(1)-16(n) operate within the memory 24 of the audit management apparatus 14.

The administrator devices 18(1)-18(n) of the audit management system 12 in this example include any type of computing device that can receive, render, and facilitate user interaction with a graphical user interface, such as mobile computing devices, desktop computing devices, laptop computing devices, tablet computing devices, virtual machines (including cloud-based computers), or the like. Each of the administrator devices 18(1)-18(n) in this example includes a processor, a memory, and a communication interface, which are coupled together by a bus or other communication link, although other numbers and/or types of network devices could be used.

The administrator devices 18(1)-18(n) may run interface applications, such as standard web browsers or standalone client applications, which may provide an interface to communicate with the audit management apparatus 14 via the communication network(s) 20 in order to initiate web site audits and/or receive and interact with reports associated with audited web sites, for example. The administrator devices 18(1)-18(n) may further include a display device, such as a display screen or touchscreen, and/or an input device, such as a keyboard for example.

Although the exemplary audit management system 12 with the audit management apparatus 14, server devices 16(1)-16(n), administrator devices 18(1)-18(n), and communication network(s) 20 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the audit management system 12, such as the audit management apparatus 14, administrator devices 18(1)-18(n), or server devices 16(1)-16(n), for example, may be configured to operate as virtual instances on the same physical machine. In other words, one or more of the audit management apparatus 14, administrator devices 18(1)-18(n), or server devices 16(1)-16(n) may operate on the same physical device rather than as separate devices communicating through communication network(s) 20. Additionally, there may be more or fewer audit management apparatuses, client devices, or server devices than illustrated in FIG. 1. The administrator devices 18(1)-18(n) could also be implemented as applications on the audit management apparatus 14 as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
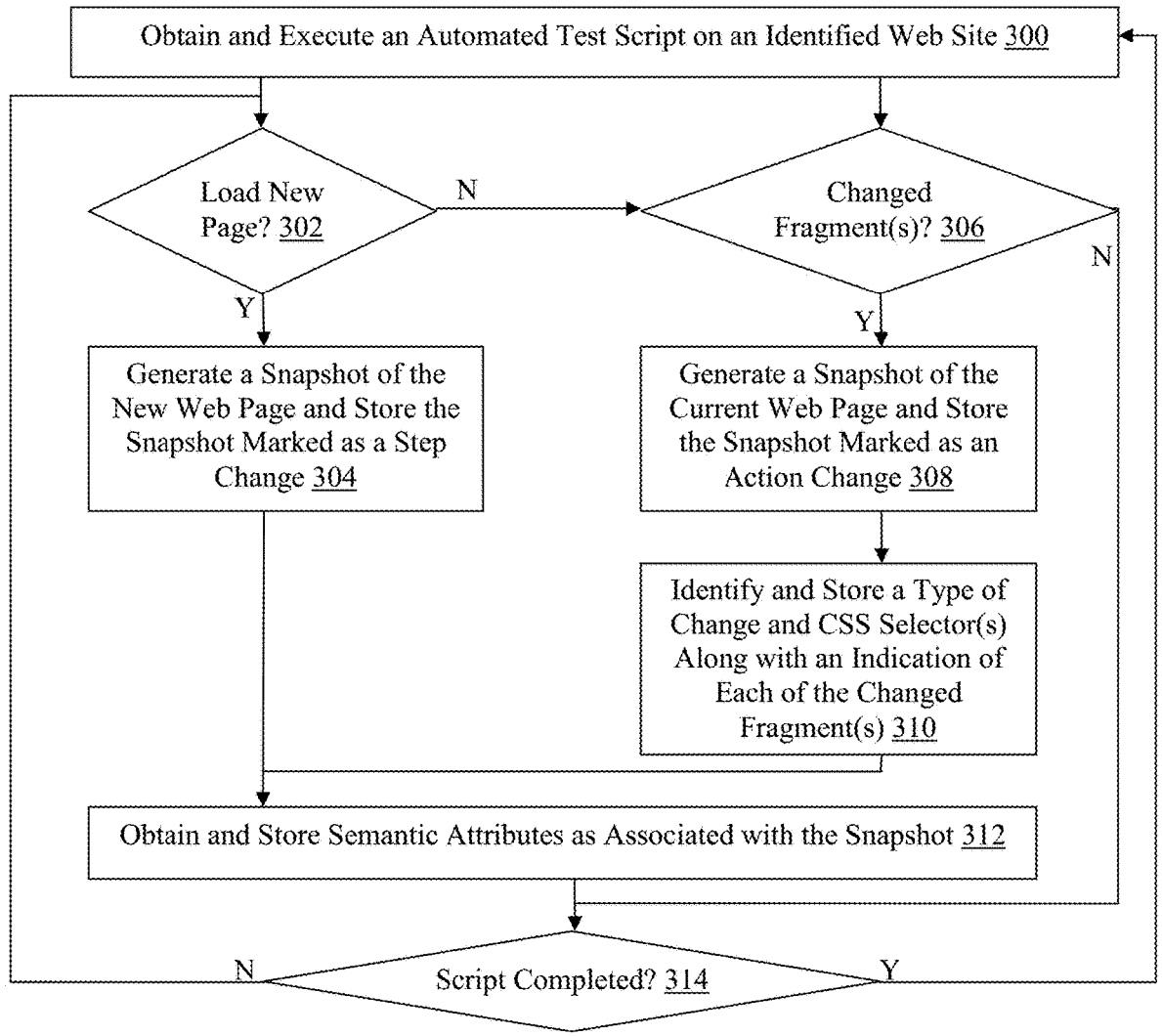
FIG. 3 is a flow chart of an exemplary method for automatically obtaining snapshots for step and action changes along with associated semantic attributes to facilitate web site auditing.

An exemplary method of improved auditing of web sites will now be described with reference to FIGS. 1-14. Referring more specifically to FIG. 3, a method of automatically obtaining snapshots for step and action changes along with associated semantic attributes to facilitate web site auditing is illustrated. In step 300 in this example, the audit management apparatus 14 of the audit management system 12 obtains and executes one of the automated test script(s) 32 on an identified web site. Optionally, the web site on which the one of the automated test script(s) 32 is executed can be identified by a user of one of the administrator devices 18(1)-18(n) via an interface provided by the audit management apparatus 14, although other methods of identifying the web site to be audited can also be used.

In some examples, the one of the automated test script(s) 32 can be executed by any type of web browser including a headless web browser. Additionally, the one of the automated test script(s) 32 includes instructions that correspond to actions performed on a web browser window. In particular, the one of the automated test script(s) 32 causes the audit management apparatus 14 to initiate actions including step changes and action changes with respect to the identified web site, as described and illustrated in more detail later.

Figure 4:
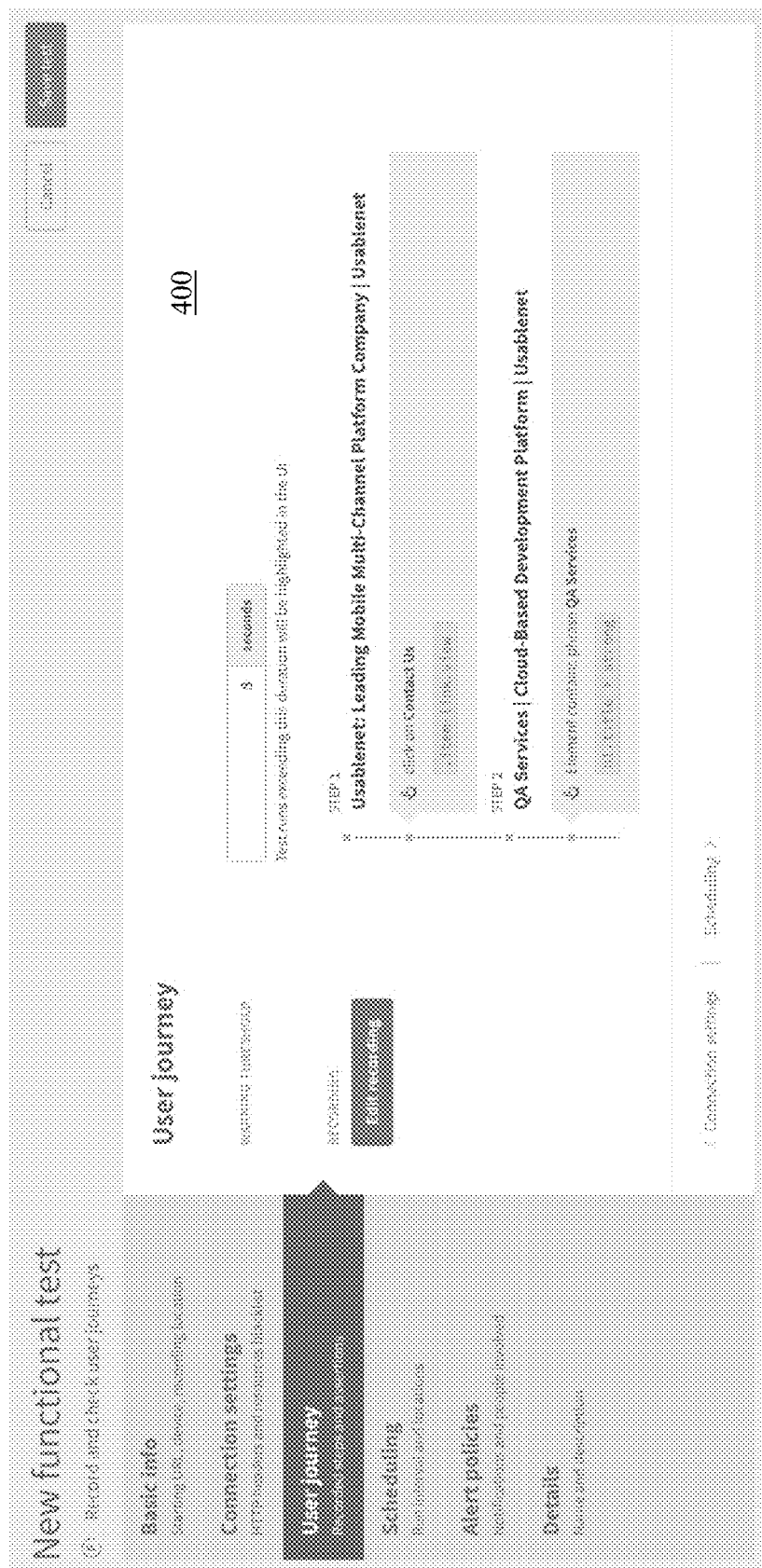
FIG. 4 is a screen shot illustrating step and action changes associated with an exemplary task flow performed by an automated test script on a web site.

The step changes and action changes collectively correspond with one or more task flows or journeys through the identified web site. Referring more specifically to FIG. 4, a screen shot 400 illustrating step and action changes associated with an exemplary task flow performed by one of the automated test script(s) 32 on an identified web site is illustrated. In this particular example, the task flow includes loading a home web page of a web site, selecting a contact us dynamic element of the home web page, and selecting a new web page of the web site.

Referring back to FIG. 3, in step 302, the audit management apparatus 14 of the audit management system 12 determines whether the execution of the one of the automated test script(s) 32 has resulted in the loading of a new web page. In a first iteration, the one of the automated test script(s) 32 will result in the loading of a new web page, which may be a home page of a web site, for example. If the audit management apparatus 14 determines that the execution of the one of the automated test script(s) 32 has resulted in the loading of a new web page, then the Yes branch is taken to step 304.

Figure 5:
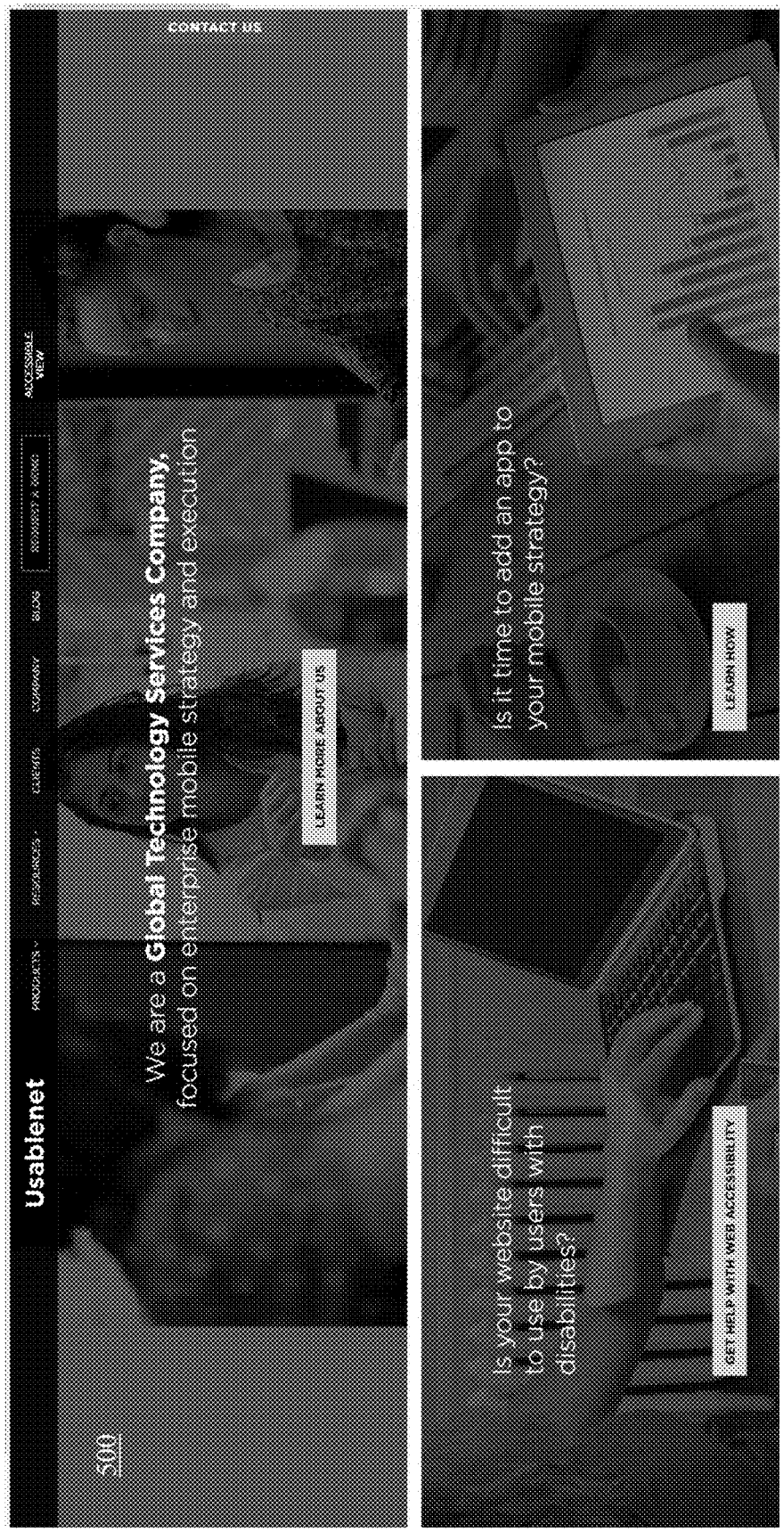
FIG. 5 is a screen shot of a web page of the web site that is associated with an exemplary step change of the exemplary task flow of FIG. 4.

In step 304, the audit management apparatus 14 of the audit management system 12 generates a snapshot of the new web page and stores the snapshot marked as a step change. Optionally, the snapshot generated in step 304 can be stored in the audit database 36. Referring more specifically to FIG. 5, a screen shot of a web page 500 of the web site identified in step 300 that is associated with an exemplary step change of the exemplary task flow of FIG. 4 is illustrated. In this example, the web page 500 is a home page of the web site, but the web page can be any type of web page associated with a web site in other examples.

Referring back to FIG. 3, if the audit management apparatus 14 determines in step 302 that the execution of the one of the automated test script(s) 32 has not resulted in the loading of a new web page, then the No branch is taken to step 306. In step 306, the audit management apparatus 14 of the audit management system 12 determines whether the execution of the one of the automated test script(s) 32 has resulted in the changing of only a portion or a fragment of a current web page. If the audit management apparatus 14 determines that the execution of the one of the automated test script(s) 32 has resulted in the changing of a fragment of a current web page, then the Yes branch is taken to step 308.

Figure 6:
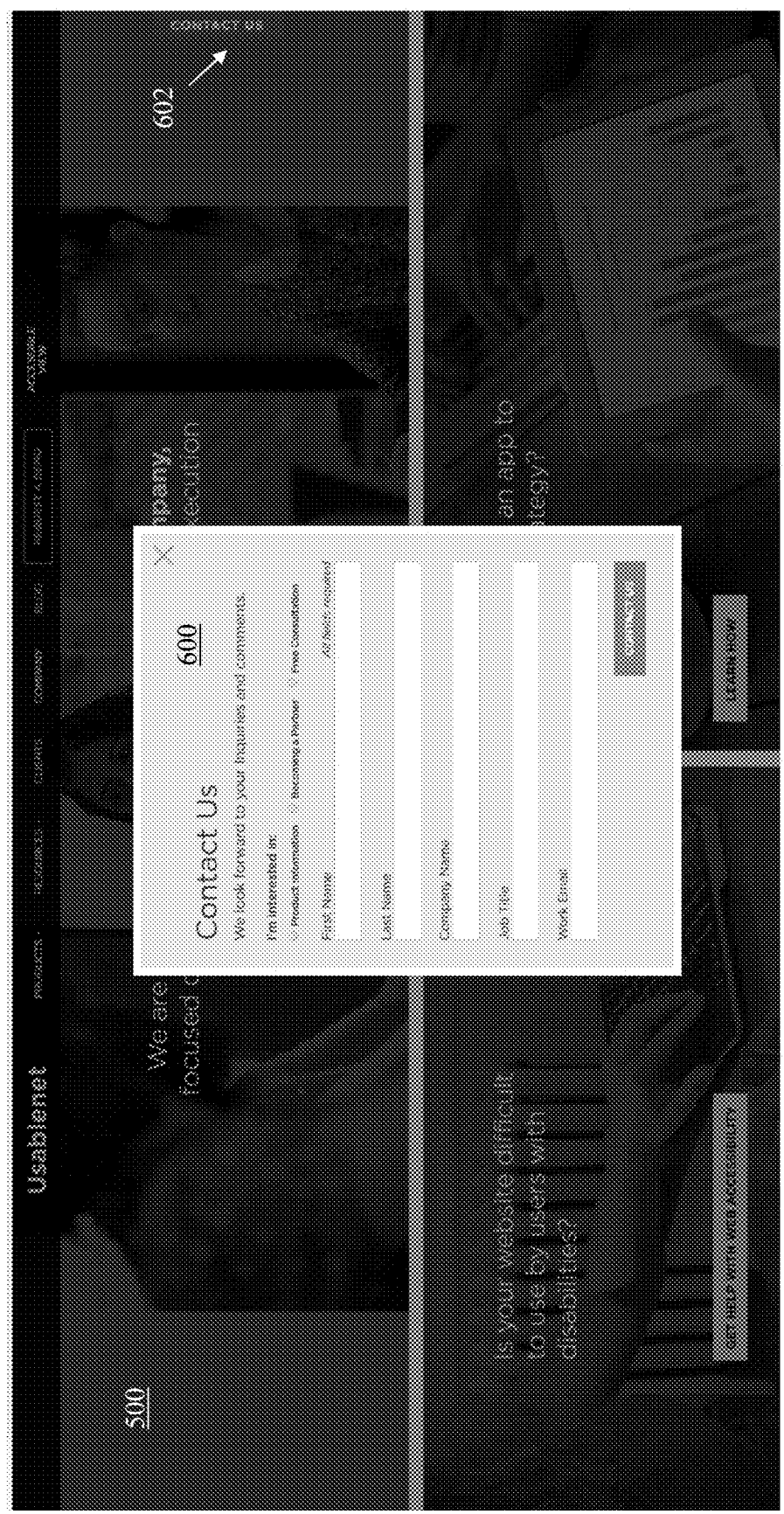
FIG. 6 is a screen shot of the web page of the web site with a dynamic overlay associated with an action change of the exemplary task flow of FIG. 4.

In step 308, the audit management apparatus 14 of the audit management system 12 generates a snapshot of at least a portion of the current web page that is associated with the changed fragment and stores the snapshot marked as an action change. Optionally, the snapshot generated in step 308 also can be stored in the audit database 36. Referring more specifically to FIG. 6, a screen shot of the web page 500 of the web site identified in step 300 with a dynamic overlay 600 associated with an action change of the exemplary task flow of FIG. 4, is illustrated. In this example, the dynamic overlay 602 is a dynamic element that is rendered over the web page 500 upon selection of a "contact us" tab 602.

In step 310, the audit management apparatus 14 of the audit management system 12 determines a type of change for each changed fragment identified in step 306. In one example, the types of change determined in step 310 can include a change to one or more attributes (e.g., a layout or an image), text content, or at least a portion of a document object model (DOM), although other types of changes can also be determined in step 310 in other examples.

The audit management apparatus 14 further identifies any cascading style sheet (CSS) selector(s) associated with the changed fragment(s). Referring back to FIG. 6, the CSS selector associated with the tab 602 can be identified in step 310. In this example, an indication of each of the changed fragment(s), the determined type of change for each of the changed fragment(s), and the determined CSS selector(s) are stored in the audit database 36 as associated with the snapshot generated and stored in step 308.

Subsequent to storing the snapshot marked as a step change, in step 304, or the indications of the changed fragment(s), the type of change(s), and the indications of CSS selector(s), in step 310, the audit management apparatus 14 proceeds to step 312. In step 312, the audit management apparatus 14 of the audit management system 12 obtains and stores semantic attributes as associated with the snapshot stored in step 304 or step 308.

In this example, the semantic attributes include layout data, image type data, and/or script type data extracted from a parsing of the web page and/or the changed fragment(s) of the web page. Exemplary layout data can include the size of a displayed image or foreground and background text color, exemplary image types can include a tracking image or icon image, and exemplary script types can include an analytics script or a chat server script, although other types of attribute data can also be obtained and/or stored in other examples. Subsequent to storing the semantic attributes in step 312, or if the audit management apparatus 14 determines in step 306 that the execution of the one of the automated test script(s) 32 has not resulted in a changing of a fragment of a current web page and the No branch is taken, then the audit management apparatus 14 proceeds to step 314.

In step 314, the audit management apparatus 14 of the audit management system 12 determines whether the one of the automated test script(s) 32 has completed its execution. If the audit management apparatus 14 determines that the one of the automated test script(s) 32 has completed its execution, then the Yes branch is taken back to step 300. However, if the audit management apparatus 14 determines that the one of the automated test script(s) 32 has not completed its execution, then the No branch is taken back to step 302.

Figure 7:
FIG. 7 is a screen shot of another web page of the web site associated with another step change of the exemplary task flow of FIG. 4.

In a subsequent iteration, the audit management apparatus 14 can determine in step 302 that another new web page has been loaded as a result of the execution of the one of the automated test script(s) 32. Referring more specifically to FIG. 7, a screen shot of another web page 700 of the web site identified in step 300, associated with another step change of the exemplary task flow of FIG. 4, is illustrated. In this iteration, selection of a link in a menu of the web page 500 can result in the loading of the new web page 700.

Accordingly, the audit management apparatus 14 executes the one of the automated test script(s) 32 and effectively waits for a step or action change, or for the one of the automated test script(s) 32 to complete its execution. Upon determining that a step or action change has occurred, the audit management apparatus 14 generates and stores snapshot(s) and obtains and stores data including semantic data and/or an indication of a type of change, CSS selector(s), or changed fragment(s) as associated with the snapshot(s), which are advantageously used as described and illustrated in more detail with reference to FIGS. 8-14.

Figure 8:
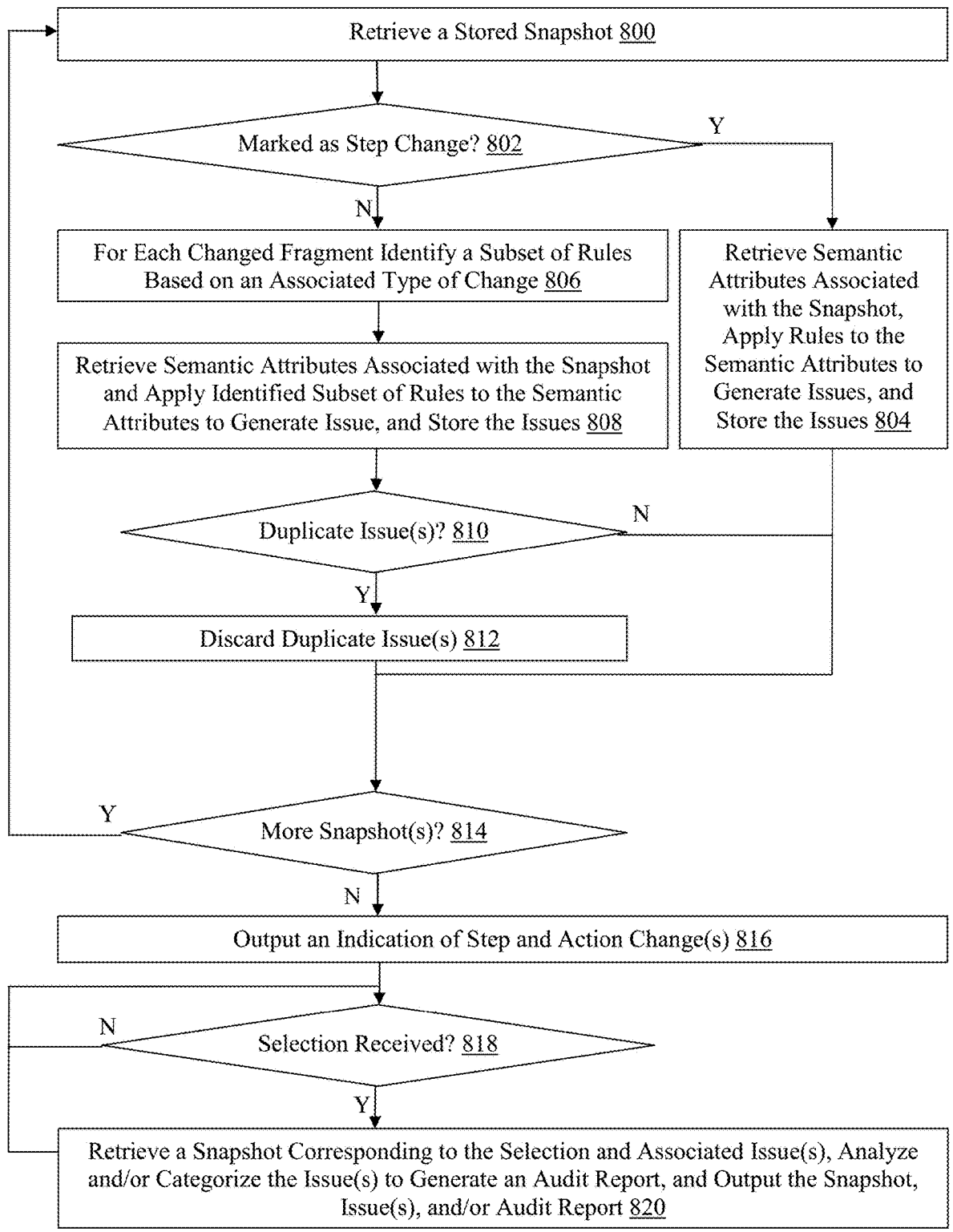
FIG. 8 is a flow chart of an exemplary method for identifying issues as part of a web site audit and generating and facilitating interaction with an audit report.

Referring more specifically to FIG. 8, a method of identifying issues as part of a web site audit and generating and facilitating interaction with an audit report is illustrated. In step 800 in this example, the audit management apparatus 14 of the audit management system 12 retrieves a stored snapshot of at least a portion of a web page of a web site. Optionally, step 800 can proceed automatically upon the audit management apparatus 14 determines in step 314 of FIG. 3 that the one of the automated test script(s) 32 has completed its execution. Alternatively, step 800 can be initiated by a user of one of the administrator device 18(1)-18(n) separate from the execution of the one of the automated test script(s) 32.

In step 802, the audit management apparatus 14 of the audit management system 12 determines whether the retrieved snapshot is marked as a step change, corresponding with the loading of a new web page during execution of the one of the automated test script(s) 32. In one example, the snapshot can be retrieved in step 800 from the audit database 36 and could have been generated, stored, and/or marked as described and illustrated in more detail earlier with reference to step 304 or 308 of FIG. 3.

If the audit management apparatus 14 determines that the retrieved snapshot is marked as a step change, then the Yes branch is taken to step 804. In step 804, the audit management apparatus 14 of the audit management system 12 retrieves the semantic attributes associated with the retrieved snapshot and applies a plurality of rules to the semantic attributes to generate one or more issues. The semantic attributes can be retrieved from the audit database 36 and could have been obtained and stored as described and illustrated in more detail earlier with reference to step 312 of FIG. 3, for example.

The applied rules can be based on an established policy relating to correctness, performance, usability, accessibility, and/or security of a web site, although one or more of the rules can relate to another aspect of web site quality in other examples. As one example, an accessibility rule can be that all non-text content that is presented to a user has a text alternative that serves the equivalent purpose, although any other types or numbers of rules can also be used. The generated issues can relate to a failure of an aspect of a web page identified in the semantic attributes to comply with one or more of the applied rules. The audit management apparatus 14 further stores the generated issues, such as in the audit database 36, as associated with the retrieved snapshot and, optionally, a respective corresponding one of the rules that resulted in each of the generated issues.

Referring back to step 802, if the audit management apparatus 14 determines that the retrieved snapshot is not marked as a step change, then the retrieved snapshot is marked as an action change, and the No branch is taken to step 806. In step 806, the audit management apparatus 14 of the audit management system 12 identifies a subset of the rules applied in step 804 for each changed fragment corresponding to the retrieved snapshot, based on an associated type of change. An indication of the changed fragments corresponding to the retrieved snapshot, as well as the indication of the type of change, can be retrieved from the audit database 36 and could have been stored as described and illustrated and more detail earlier with reference to step 310 of FIG. 3.

In step 808, the audit management apparatus 14 of the audit management system 12 retrieves semantic attributes associated with the retrieved snapshot and applies the subset of the rules identified in step 806 in order to generate one or more issues. The semantic attributes can be retrieved from the audit database 36 and could have been obtained and stored as described and illustrated in more detail earlier with reference to step 312 of FIG. 3, for example. Accordingly, only a subset of the rules corresponding to a type of change (e.g., attribute, text content, or DOM) are identified in step 806 and applied in step 808. The audit management apparatus 14 also stores the generated issues, such as in the audit database 36, as associated with the retrieved snapshot and, optionally, a respective corresponding one of the rules that resulted in each of the generated issues.

In step 810, the audit management apparatus 14 of the audit management system 12 optionally determines whether any duplicate issues were generated in step 808. Since only one or more portions of the fragment may have changed, applying the identified subset of rules in step 808 may result in generated duplicate issues to those previously generated in step 804 for the associated web page of the web site. If the audit management apparatus 13 determines that at least one duplicate issues has been generated in step 808, then the Yes branch is taken to step 812.

In step 812, the audit management apparatus 14 of the audit management system 12 discards the duplicate issue(s), such as by removing them from the audit database 32, for example. Subsequent to discarding the duplicate issues, or if the audit management apparatus determines in step 810 that no duplicate issues were generated and the No branch is taken, then the audit management apparatus 14 proceeds to step 814.

In step 814, the audit management apparatus 14 of the audit management system 12 determines whether there are any more snapshots associated with the web site that have not been retrieved, such as from the audit database 32. If the audit management apparatus 14 determines that one or more snapshots have not yet been retrieved, then the Yes branch is taken back to step 800, and the audit management apparatus 14 retrieves another stored snapshot and performs steps 802-812 with respect to the additional snapshot. However, if the audit management apparatus 14 determines in step 814 that there are no more snapshots associated with the website, then the No branch is taken to step 816.

In step 816, the audit management apparatus 14 of the audit management system 12 outputs an indication of step and action changes associated with each of the snapshots for the web site, which could have been marked as step or action changes as described and illustrated earlier with reference to step 304 or 308 of FIG. 3. Optionally, the indications of the step and action changes are output in a selectable form and via a web-based graphical user interface (GUI) to one of the administrator computing device 18(1)-18(n) from which an initial request to audit a web site was received, as described and illustrated in more detail earlier with reference to step 300 of FIG. 3, although the indications can be output in other forms in other examples.

Figure 9:
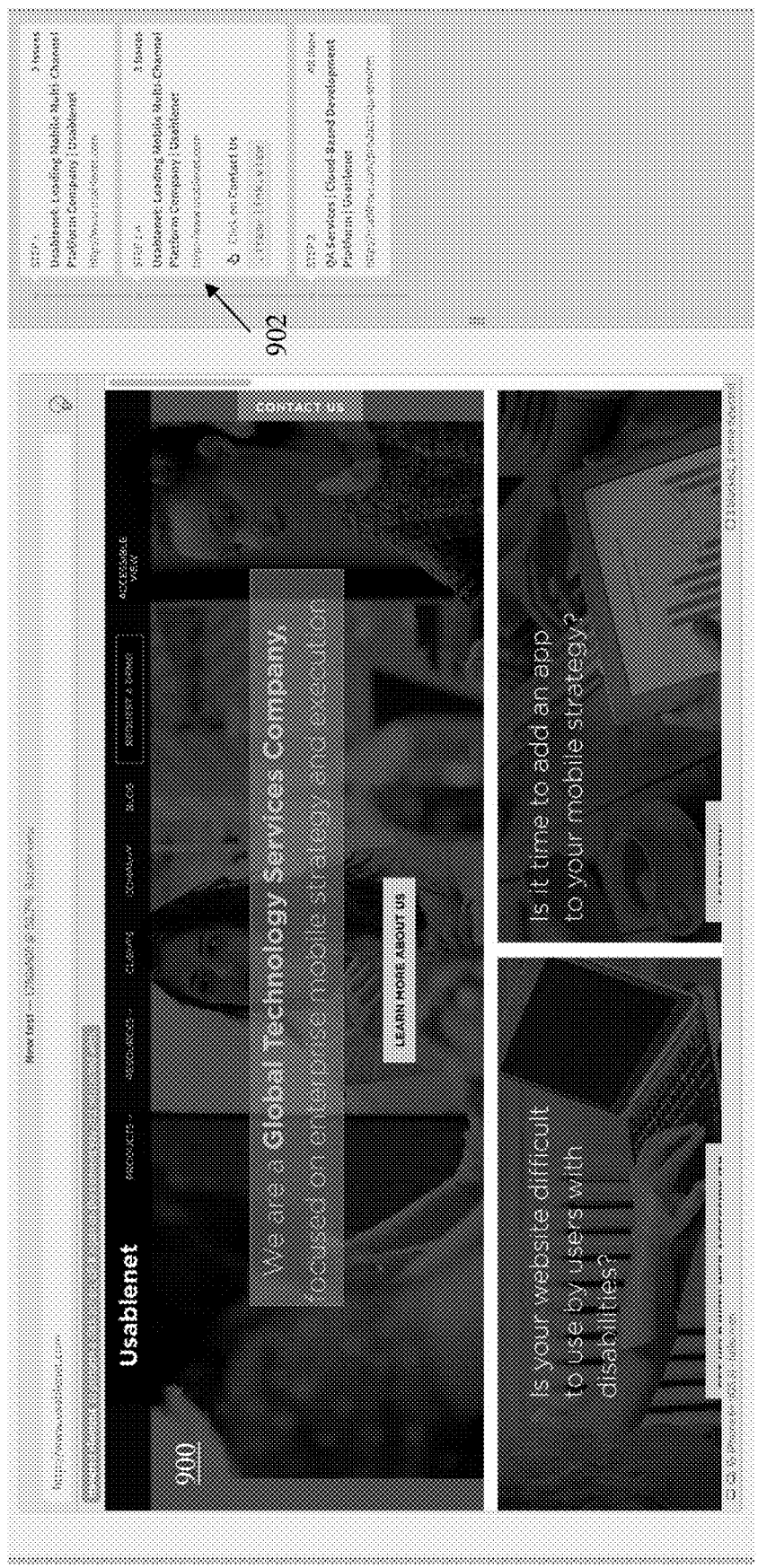
FIG. 9 is an exemplary interface with a step change snapshot associated with the web page of FIG. 6 along with a selectable indication of each of the step and action changes associated with the exemplary task flow of FIG. 4.

Referring more specifically to FIG. 9, an exemplary step change snapshot associated with the web page 600 illustrated in FIG. 6, along with a selectable indication of each of the step and action changes associated with the exemplary task flow illustrated in FIG. 4, is illustrated. In this example, selectable indications of the step and action changes are output in a sidebar 902 of the GUI, although other types of displays and interfaces can be used. As a default, the snapshot 900 for the home web page 600 of the web site is initially displayed within the GUI in this example.

Referring back to FIG. 8, in step 818, the audit management apparatus 14 of the audit management system 12 determines whether a selection of one of the indications of the step and action changes is received, such as from one of the administrator devices 18(1)-18(n), for example. If the audit management apparatus determines that none of the step or action change indications was selected, then the No branch is taken back to step 808, and the audit management apparatus effectively waits to receive a selection. However, if the audit management apparatus determines that a selection of one of the step or action change indications was received, then the Yes branch is taken to step 820.

In step 820, the audit management apparatus 14 of the audit management system 12 retrieves and outputs a snapshot corresponding to the selected step or action change and issue(s) associated with the retrieved snapshot. The audit management apparatus further optionally processes the issues by analyzes and/or categorizes the issue(s) and generates and outputs an audit report based on the processed issue(s).

Figure 10:
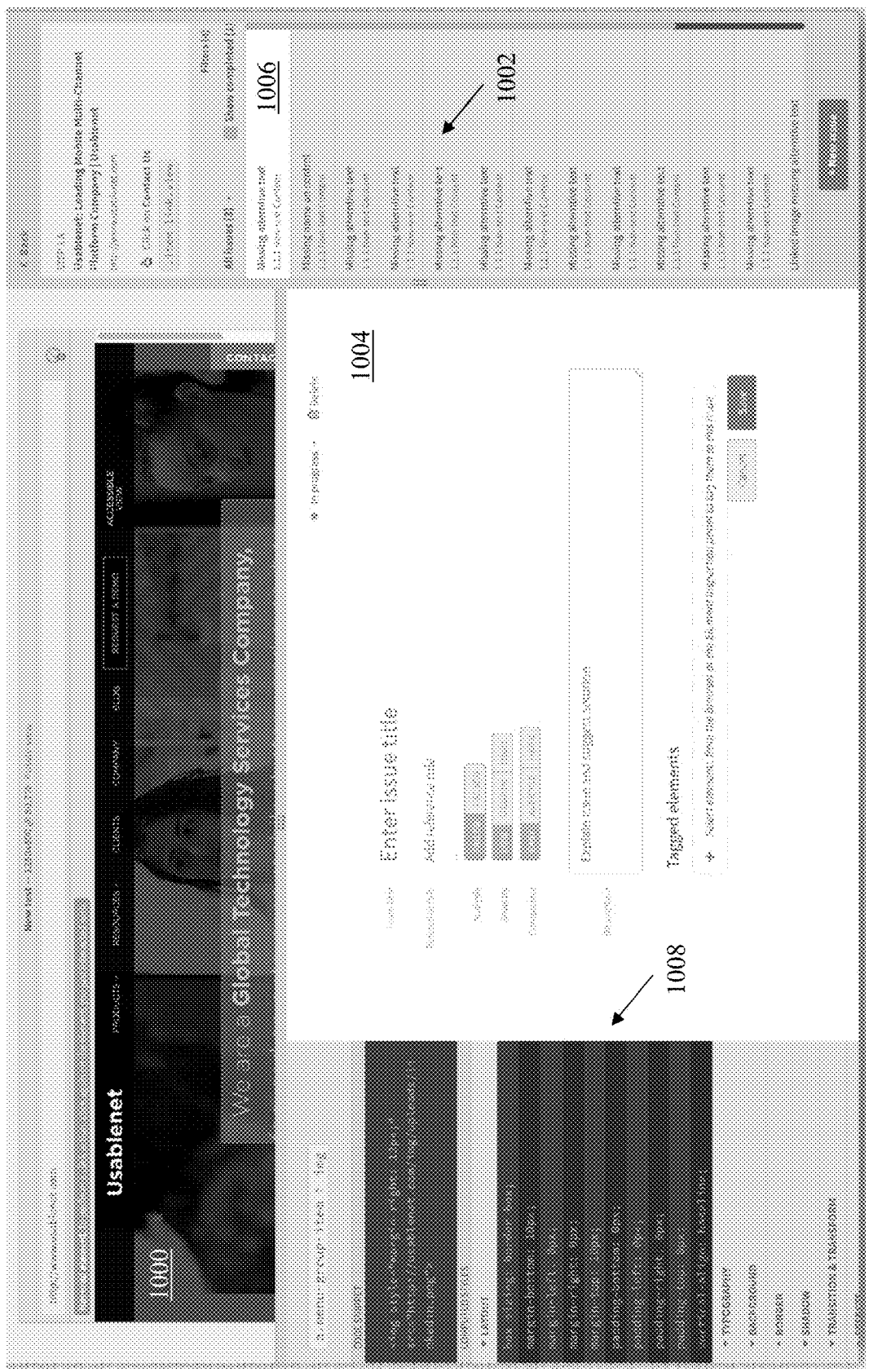
FIG. 10 is another exemplary interface with an action change snapshot associated with the action change of FIG. 6, the indication of the action change selected, identified issues associated with the action change, and a comment interface.

Referring more specifically to FIG. 10, an exemplary interface with an action change snapshot 1000 associated with the action change of FIG. 6, the indication of the selected action change, a list 1002 of identified issues associated with the action change, and a comment interface 1004 is illustrated. In this example, the audit management apparatus 14 retrieves the snapshot 1000 in response to a received selection of an indication associated with the action change (referred to in FIGS. 9-10 as step 1A). The audit management apparatus 14 also retrieves plurality of issues stored in the audit database 36 as associated with the retrieved snapshot 1000. The retrieved snapshot 1000 and a list 1002 of the issues in a selectable form are then output, such as to one of the administrator devices 18(1)-18(n), for example.

In this particular example, the audit management apparatus 14 receives a selection of an indication corresponding to one of the issues 1006 in the list 1002 and generates the optional comment interface 1004 as well as stored data 1008 associated with the one of the issues 1006, which can include portion(s) of the semantic data and/or CSS selector(s) associated with the one of the issues 1006 and/or the associated fragment, for example, although other types and numbers of data can also be provided. The comment interface 1004 facilitates the receipt and storage of notes relating to the one of the issues 1006 or other issues that may be manually identified, such as by viewing the data 1008, for example.

Figure 11:
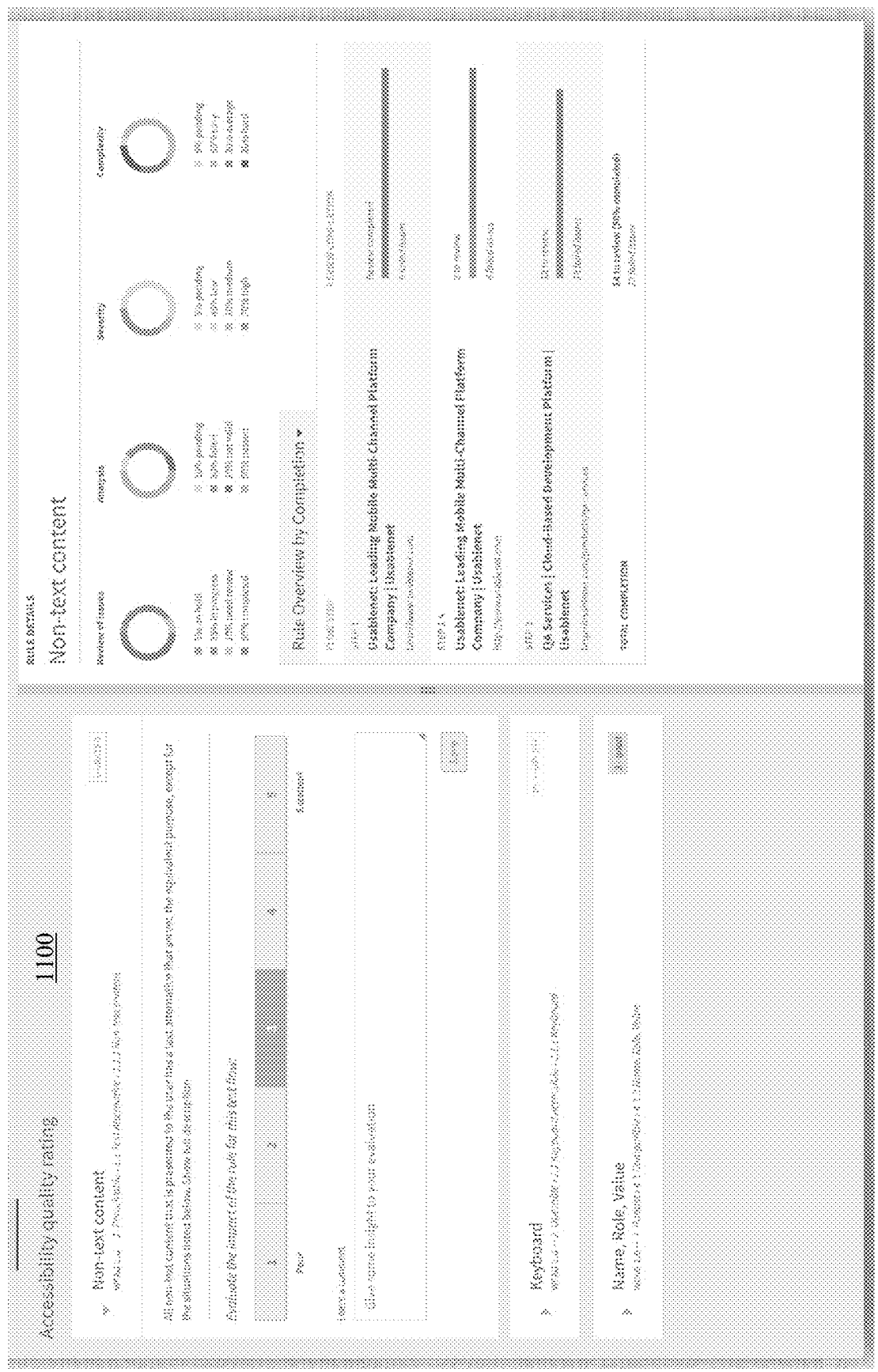
FIG. 11 is a screen shot of an exemplary audit report illustrating a completion analysis of issues with respect to the step and action changes of the exemplary task flow of FIG. 4 and a particular applied rule.

Referring more specifically to FIG. 11 a screen shot of an exemplary audit report 1100 illustrating a completion analysis of issues with respect to the step and action changes of the exemplary task flow of FIG. 4 and a particular applied rule is illustrated. The audit report 1100 can be generated automatically by the audit management apparatus 14 or in response to a received request from one of the administrator devices 18(1)-18(n), for example. In this particular example, the audit report 1100 provides a completion analysis for a particular accessibility rule relating to text alternatives for non-textual content. The audit report 1100 provides an indication of the status of the review of the identified issues relating to the accessibility rule for each of the step and action changes corresponding to the task flow illustrated in FIG. 4.

Figure 12:
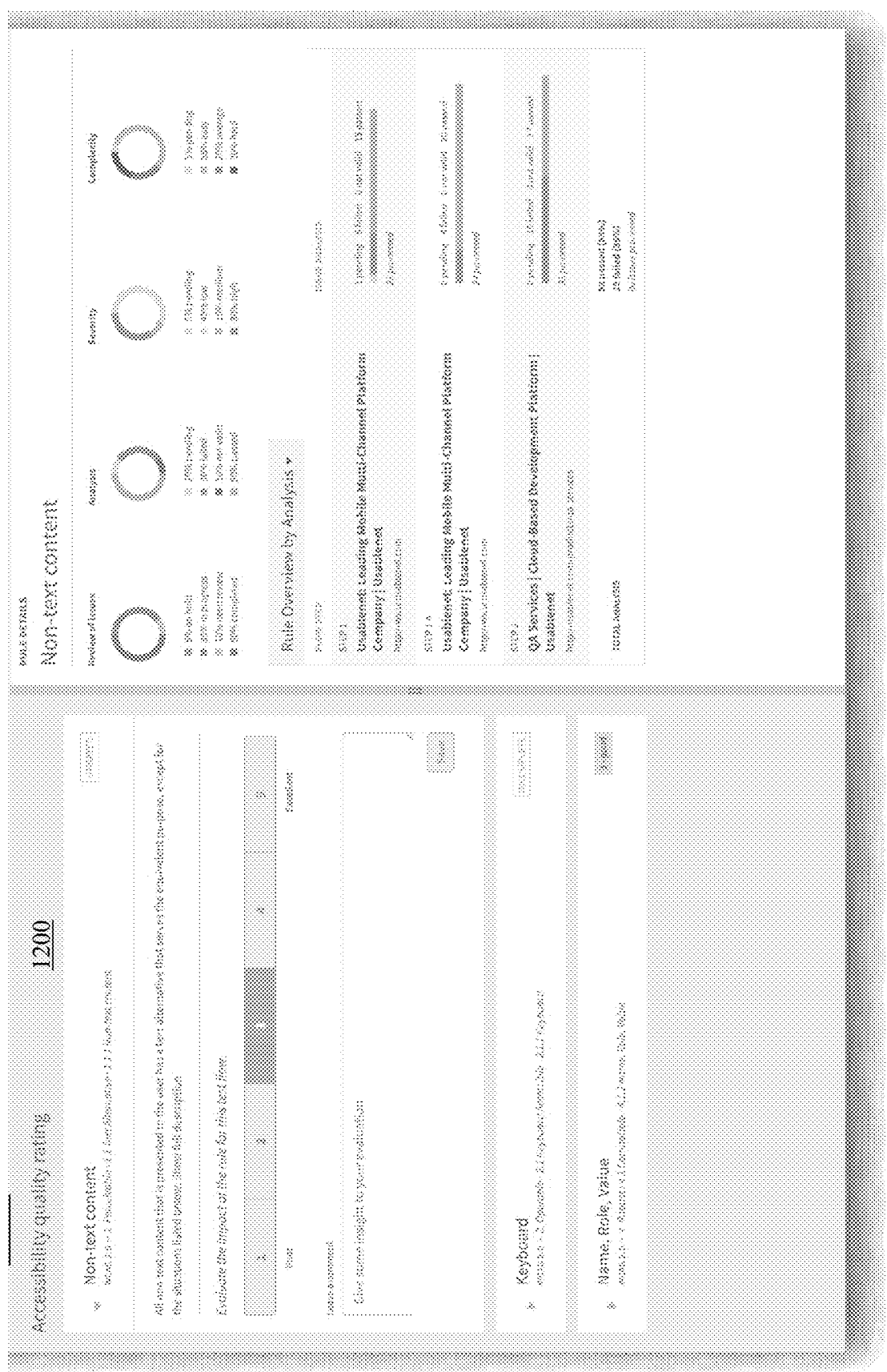
FIG. 12 is another screen shot of the exemplary audit report illustrating an overview analysis of issues with respect to the step and action changes of the exemplary task flow of FIG. 4 and the particular applied rule.

Referring more specifically to FIG. 12, a screen shot of another exemplary audit report 1200 illustrating an overview analysis of issues with respect to the step and action changes of the exemplary task flow of FIG. 4 and the particular applied rule is illustrated. In this example, the audit report 1200 provides an analysis of the issues with respect to the number of issues associated with the rule that are pending, failed, not valid, or passed for each of the step and action changes of the task flow of FIG. 4.

Figure 13:
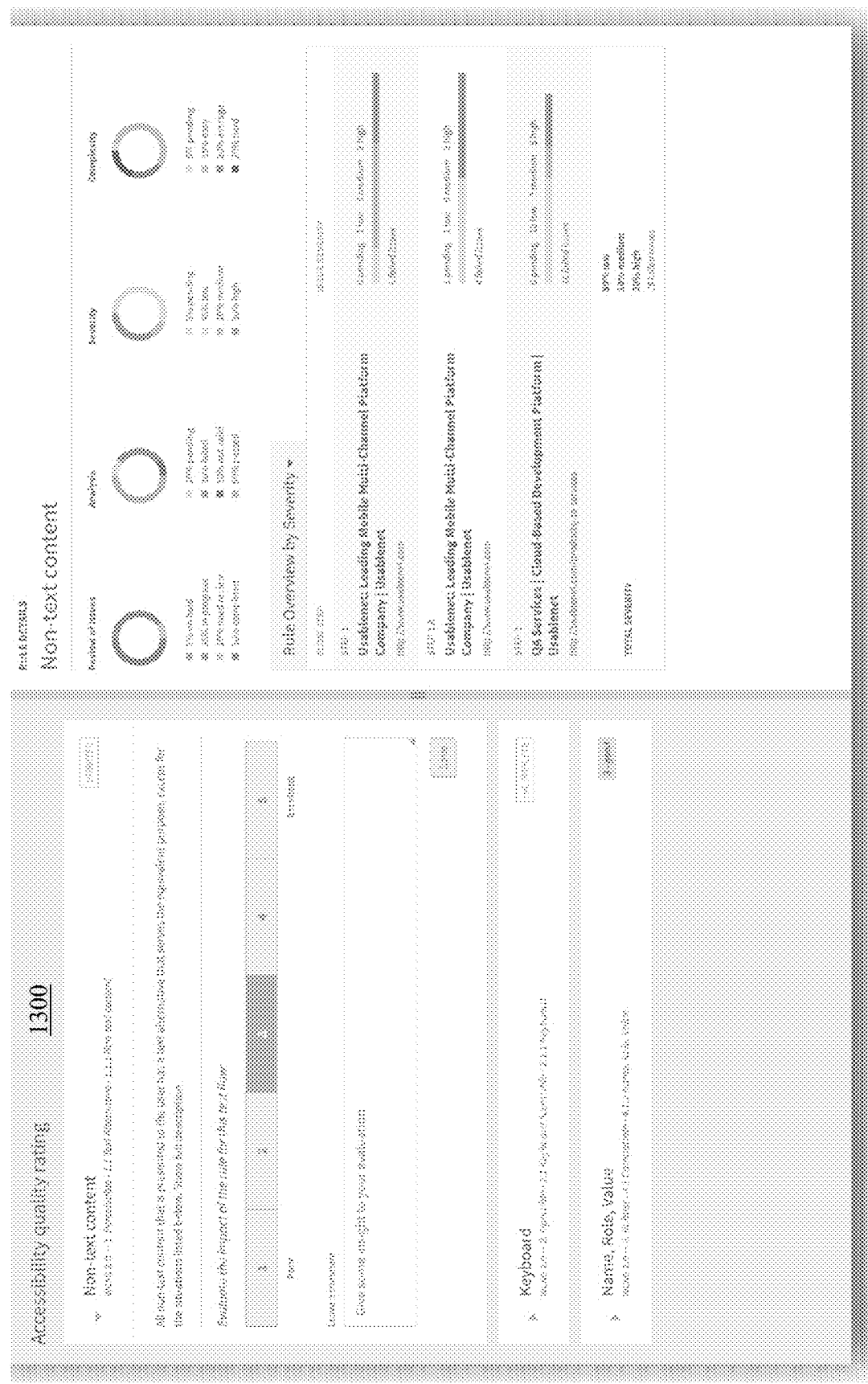
FIG. 13 is another screen shot of the exemplary audit report illustrating a severity analysis of issues with respect to the step and action changes of the exemplary task flow of FIG. 4 and the particular applied rule.

Referring more specifically to FIG. 13, a screen shot of yet another audit report 14 illustrating a severity analysis of issues with respect to the step and action changes of the exemplary task flow of FIG. 4 and the particular applied rule is illustrated. In this example, the audit management apparatus 14 analyzes the issues associated with the rule with respect to severity of the issue. With respect to the particular rule identified in the audit report 1300, a high severity may indicate that no corresponding text is provided and a low severity may indicate that only partial corresponding text is provided for a particular issue. Other types of severities and/or scales can also be used. In another example, the generated issues can be analyzed with respect to complexity, and other aspects of issues can also be analyzed and/or categorized in other examples.

Figure 14:
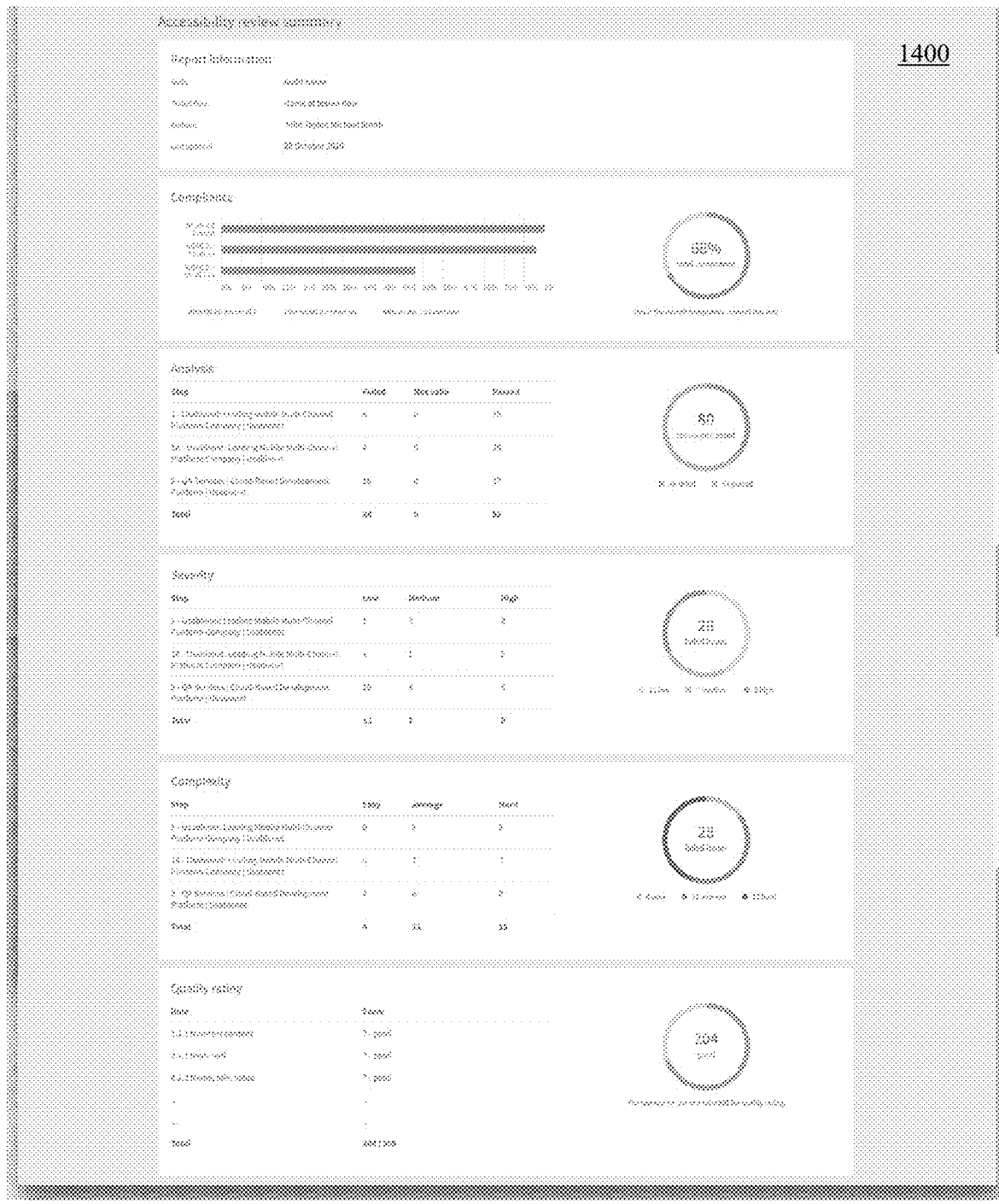
FIG. 14 is a screen shot of an exemplary audit report summary illustrating an analysis and categorization of issues with respect to the step and action changes of the exemplary task flow of FIG. 4.

Referring more specifically to FIG. 14, a screen shot of an exemplary audit report summary 1400 illustrating an analysis and categorization of issues with respect to the step and action changes of the exemplary task flow of FIG. 4 is illustrated. The audit report summary 1400 in this example includes a graphical indication of the analysis of the issues, which provides an indication of the overall compliance and quality of the audited web site.

Accordingly, this technology advantageously facilitates grouping flow steps and analyzing and summarizing associated issue properties, as well as categorizing issues for a particular flow, facilitating improved comprehension of issues and ability to improve web site quality. This technology also audits web sites with respect to changes to dynamic content and changes to portions of web pages, and advantageously facilitates viewing of snapshots of dynamic elements that generated issues. Moreover, this technology can be deployed in a cloud environment to allow multiple uses to access audit reports in order to edit and discuss issues concurrently.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improved auditing of web sites implemented by one or more audit management apparatuses, the method comprising:
   executing an automated test script comprising script instructions defining actions performed with respect to a web site;
   determining when one of the actions results in a change to a portion of a document object model (DOM) for a web page of the web site during execution of the automated test script, wherein the portion of the DOM corresponds to a dynamic fragment associated with the web page;
   automatically generating a snapshot of a graphical output of at least a portion of the web page associated with the dynamic fragment and storing the snapshot marked as an action change, after determining the one of the actions resulted in the change to the portion of the DOM;
   parsing the dynamic fragment to extract one or more semantic attributes and storing the semantic attributes as associated with the snapshot;
   applying one or more accessibility rules to the semantic attributes extracted from the dynamic fragment to generate and output an indication of one or more accessibility issues resulting from a failure of one or more of the semantic attributes to comply with one or more of the accessibility rules; and
   retrieving and outputting the snapshot and the one or more of the semantic attributes to a graphical display upon receiving a selection of one or more of the output indications of the accessibility issues.

2. The method of claim 1, further comprising identifying and storing one or more cascading style sheet (CSS) selectors associated with one or more of the accessibility issues that resulted from a failure of the CSS selectors to comply with the one or more of the accessibility rules.

3. The method of claim 1, further comprising:
   determining when at least one of the actions is loading of a new web page of the web site;
   generating and storing another snapshot of at least a portion of the new web page, when the determination indicates the one of the actions is loading of the new web page;
   parsing additional source code for the new web page to obtain another one or more semantic attributes associated with the another snapshot, wherein the another one or more semantic attributes comprise layout data, image type data, or script type data; and
   applying the accessibility rules to the another one or more semantic attributes to generate and output another one or more accessibility issues resulting from a failure of the another one or more of the semantic attributes to comply with another one or more of the accessibility rules.

4. The method of claim 1, further comprising determining the accessibility rules applied to the semantic attributes based on a type of change associated with the snapshot.

5. The method of claim 1, further comprising outputting an audit report to a graphical display, the audit report comprising an indication of the issues corresponding to the snapshot organized in one or more categories based on an automated analysis of the issues.

6. The method of claim 1, further comprising:
parsing source code for the dynamic fragment to extract the semantic attributes; and
applying the one or more accessibility rules to the semantic attributes extracted from the source code to generate and output the indication of the accessibility issues resulting from the failure of the one or more of the semantic attributes to comply with the one or more of the accessibility rules.

7. An audit management apparatus, comprising memory comprising programmed instructions stored thereon and one or more processors configured to execute the stored programmed instructions to:
execute an automated test script comprising script instructions defining actions performed with respect to a web site;
determine when one of the actions results in a change to a portion of a document object model (DOM) for a web page of the web site during execution of the automated test script, wherein the portion of the DOM corresponds to a dynamic fragment associated with the web page;
automatically generate a snapshot of a graphical output of at least a portion of the web page associated with the dynamic fragment and store the snapshot marked as an action change, after determining the one of the actions resulted in the change to the portion of the DOM;
parse the dynamic fragment to extract one or more semantic attributes and store the semantic attributes as associated with the snapshot;
apply one or more accessibility rules to the semantic attributes extracted from the dynamic fragment to generate and output an indication of one or more accessibility issues resulting from a failure of one or more of the semantic attributes to comply with one or more of the accessibility rules; and
retrieve and output the snapshot and the one or more of the semantic attributes to a graphical display upon receiving a selection of one or more of the output indications of the accessibility issues.

8. The audit management apparatus of claim 7, wherein the processors are further configured to execute the stored programmed instructions to identify and store one or more cascading style sheet (CSS) selectors associated with one or more of the accessibility issues that resulted from a failure of the CSS selectors to comply with the one or more of the accessibility rules.

9. The audit management apparatus of claim 7, wherein the processors are further configured to execute the stored programmed instructions to:
determine when at least one of the actions is loading of a new web page of the web site;
generate and store another snapshot of at least a portion of the new web page, when the determination indicates the one of the actions is loading of the new web page;
parse additional source code for the new web page to obtain another one or more semantic attributes associated with the another snapshot, wherein the another one or more semantic attributes comprise layout data, image type data, or script type data; and
apply the accessibility rules to the another one or more semantic attributes to generate and output another one or more accessibility issues resulting from a failure of the another one or more of the semantic attributes to comply with another one or more of the accessibility rules.

10. The audit management apparatus of claim 7, wherein the processors are further configured to execute the stored programmed instructions to determine the accessibility rules applied to the semantic attributes based on a type of change associated with the snapshot.

11. The audit management apparatus of claim 7, wherein the processors are further configured to execute the stored programmed instructions to output an audit report to a graphical display, the audit report comprising an indication of the issues corresponding to the snapshot organized in one or more categories based on an automated analysis of the issues.

12. The audit management apparatus of claim 7, wherein the processors are further configured to execute the stored programmed instructions to:
parse source code for the dynamic fragment to extract the semantic attributes; and
apply the one or more accessibility rules to the semantic attributes extracted from the source code to generate and output the indication of the accessibility issues resulting from the failure of the one or more of the semantic attributes to comply with the one or more of the accessibility rules.

13. A non-transitory computer readable medium having stored thereon instructions for improved auditing of web sites comprising executable code which when executed by one or more processors, causes the processors to:
execute an automated test script comprising script instructions defining actions performed with respect to a web site;
determine when one of the actions results in a change to a portion of a document object model (DOM) for a web page of the web site during execution of the automated test script, wherein the portion of the DOM corresponds to a dynamic fragment associated with the web page;
automatically generate a snapshot of a graphical output of at least a portion of the web page associated with the dynamic fragment and store the snapshot marked as an action change, after determining the one of the actions resulted in the change to the portion of the DOM;
parse the dynamic fragment to extract one or more semantic attributes and store the semantic attributes as associated with the snapshot;
apply one or more accessibility rules to the semantic attributes extracted from the dynamic fragment to generate and output an indication of one or more accessibility issues resulting from a failure of one or more of the semantic attributes to comply with one or more of the accessibility rules; and
retrieve and output the snapshot and the one or more of the semantic attributes to a graphical display upon receiving a selection of one or more of the output indications of the accessibility issues.

14. The non-transitory computer readable medium of claim 13, wherein the executable code, when executed by the processors, further causes the processors to identify and store one or more cascading style sheet (CSS) selectors associated with one or more of the accessibility issues that resulted from a failure of the CSS selectors to comply with the one or more of the accessibility rules.

15. The non-transitory computer readable medium of claim 13, wherein the executable code, when executed by the processors, further causes the processors to:
   determine when at least one of the actions is loading of a new web page of the web site;
   generate and store another snapshot of at least a portion of the new web page, when the determination indicates the one of the actions is loading of the new web page;
   parse additional source code for the new web page to obtain another one or more semantic attributes associated with the another snapshot wherein the another one or more semantic attributes comprise layout data, image type data, or script type data; and
   apply the accessibility rules to the another one or more semantic attributes to generate and output another one or more accessibility issues resulting from a failure of the another one or more of the semantic attributes to comply with another one or more of the accessibility rules.

16. The non-transitory computer readable medium of claim 13, wherein the executable code, when executed by the processors, further causes the processors to determine the accessibility rules applied to the semantic attributes based on a type of change associated with the snapshot.

17. The non-transitory computer readable medium of claim 13, wherein the executable code, when executed by the processors, further causes the processors to output an audit report to a graphical display, the audit report comprising an indication of the issues corresponding to the snapshot organized in one or more categories based on an automated analysis of the issues.

18. The non-transitory computer readable medium of claim 13, wherein the executable code, when executed by the processors, further causes the processors to:
   parse source code for the dynamic fragment to extract the semantic attributes; and
   apply the one or more accessibility rules to the semantic attributes extracted from the source code to generate and output the indication of the accessibility issues resulting from the failure of the one or more of the semantic attributes to comply with the one or more of the accessibility rules.

* * * * *